(No Model.)

J. A. CRANDALL.
BRAKE FOR BABY CARRIAGES.

No. 582,899.                     Patented May 18, 1897.

Witnesses
Geo. M. Lamasure
G. H. Walmsley

Inventor
Jesse A. Crandall
By Alexander Davis
his Attorneys

UNITED STATES PATENT OFFICE.

JESSE A. CRANDALL, OF BROOKLYN, NEW YORK, ASSIGNOR OF ONE-HALF TO WILLIAM H. ADAMS, OF SAME PLACE.

BRAKE FOR BABY-CARRIAGES.

SPECIFICATION forming part of Letters Patent No. 582,899, dated May 18, 1897.

Application filed February 5, 1897. Serial No. 622,158. (No model.)

*To all whom it may concern:*

Be it known that I, JESSE A. CRANDALL, a citizen of the United States, residing at Brooklyn, in the county of Kings and State of New York, have invented certain new and useful Improvements in Brakes for Baby-Carriages, of which the following is a specification, reference being had therein to the accompanying drawings, in which—

Figure 1:
Figure 2:
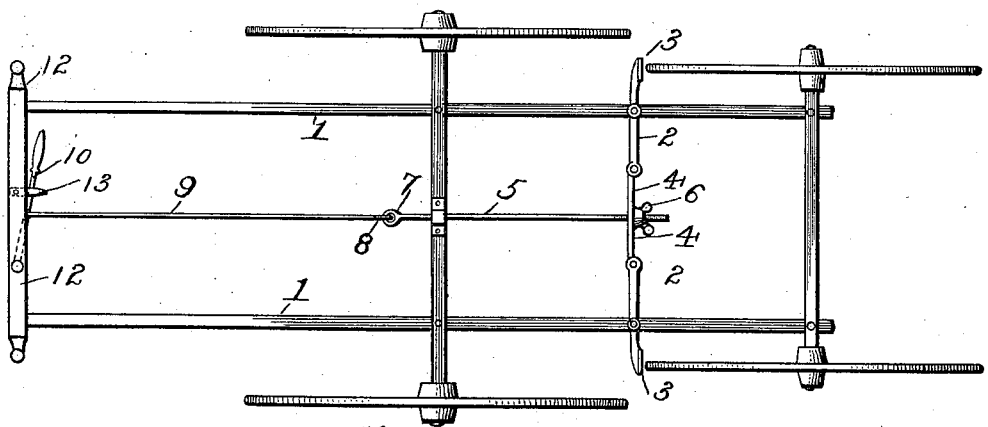
Figure 3:
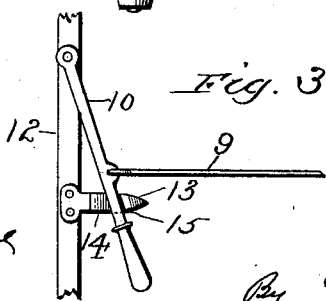

Figure 1 is a perspective view of a carriage, showing my improved brake in position. Fig. 2 is a bottom view thereof. Fig. 3 is a detail bottom view of the device for holding the lever.

This invention relates to a new and useful improvement in brakes for baby-carriages; and it has for its object to provide an exceedingly simple brake which may be readily set to hold the wheels against rotation or released and held in its released position.

This invention consists in the novel combination and arrangement of parts hereinafter described, and particularly pointed out in the claims appended.

Referring to the parts by numerals, 1 1 designate the side-bars of a carriage, which are secured to the axle in the usual way. Pivoted to each of these side-bars at coincident points near the rear edge of the front wheel is a lever 2, which carries at its outer end a brake-shoe 3, which is adapted to engage the rim of the adjacent wheel. The inner end of each lever is pivoted to one end of a rigid link 4, which connects the two levers 2, as shown. Connected to the center of this link 4 is a rod 5, which extends rearwardly and passes through an aperture in the rear axle or through a suitable guide secured thereon. The forward end of this rod passes loosely through the link 4 and is threaded to receive a set-screw 6 on its forward end, said set-screw bearing against the forward side of the link. By means of this set-screw the positions of the brake-shoes in relation to the wheel-rims may be varied to secure the proper operation of the brakes.

The rear end of the rod 5 is formed into an eye 7 and engaging therewith is an eye 8, formed on the lower end of the upwardly and rearwardly extending rod 9, which is secured at its rear end to a lever 10, which is pivoted upon the handle 12 of the carriage. Secured also upon the handle 12 is a forwardly-extending spring-plate 13, which is formed with two upwardly-extending stops 14 and 15. When it is desired to put the brake on the wheels, the lever 10 is pulled rearwardly and dropped behind stop 14.

To insure the brakes fitting tightly on the wheels in this position, the connection between the link 4 and rod 5 is made adjustable, as described. When it is desired to release the brakes, lever 10 is released from stop 14 and forced forward to stop 15, where it will remain until it is desired to again put on the brakes.

It will thus be seen that I provide a brake which may be accurately adjusted so as to apply the brakes with the desired degree of force. It will also be noted that the brakes will be operated simultaneously.

It will of course be understood that the pivotal connections of the ends of link 4 with the ends of the levers 2 will be sufficiently loose to permit the brake-levers to be operated by the lever 10. Because of the provision of the means for adjusting the brake-levers to secure their proper position in relation to the rims of the wheels the movement of the said levers need be very small. It will also be noted that the levers may be adjusted to compensate for any wear of the brake-shoes or the tires of the wheels, which latter, if the tires be made of rubber, may be considerable.

Having thus fully described my invention, what I claim, and desire to secure by Letters Patent, is—

1. A brake for a baby-carriage comprising a pair of levers pivoted to the side-bars of a carriage, a rigid link connecting their inner ends, their outer ends being adapted to engage the rims of the adjacent wheels, an operating-rod connected to said link and extending rearwardly, a lever connected to the rear end of said rod by a non-elastic connection and pivoted on the carriage, and means for holding said lever in its adjusted positions, whereby the brake may be positively actuated by the lever to hold or release the wheels and may be held in either of its positions substantially as described.

2. A brake for a baby-carriage, comprising a pair of levers pivoted to the side-bars of the carriage, a rigid link connecting their inner ends, their outer ends being adapted to engage the rims of the adjacent wheels, a rod adjustably connected to said link, said rod extending rearwardly, a guide on the rear axle for said rod, a lever pivoted on the handle of the carriage, said rod being connected to said lever by a non-elastic connecting means, and means carried by the handle for securing the lever in its various positions, whereby the brake may be positively actuated by the lever to hold the wheels or to release them, and the brake may be adjusted to secure their proper operation substantially as described.

3. A brake for a baby-carriage comprising a pair of levers pivoted to the side-bars of the carriage, a rigid link connecting their inner ends, their outer ends being adapted to engage the rims of the adjacent wheels, a rod passing centrally through said link, its rear end being screw-threaded, an adjustable stop mounted on said rod and adapted to engage the front side of the link, the said rod extending rearwardly and being guided by the axle, a lever pivoted on the handle of the carriage, said lever being connected to the rod by a non-elastic connecting means, and a spring-plate carried by the handle and formed with stops adapted to engage the lever and hold it in its positions, substantially as described.

In testimony whereof I affix my signature in presence of two witnesses.

JESSE A. CRANDALL.

Witnesses:
NOAH TEBBETTS,
WM. H. CUNNINGHAM.